United States Patent Office 3,642,958
Patented Feb. 15, 1972

3,642,958
ISOBUTOXY-S-(4-CHLOROPHENYL)
ETHYLPHOSPHONODITHIOATE
Mervin E. Brokke, Richmond, Julius J. Menn, Saratoga, and Stephen C. Dorman, Los Gatos, Calif., assignors to Stauffer Chemical Company, New York, N.Y.
No Drawing. Filed May 14, 1968, Ser. No. 728,902
Int. Cl. C07f 9/40; A01n 9/36
U.S. Cl. 260—961         1 Claim

ABSTRACT OF THE DISCLOSURE

Isobutoxy ethylphosphonodithioates of the formula

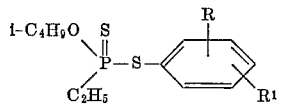

wherein R is hydrogen or methyl and $R^1$ is hydrogen or chlorine. The compounds are useful as insecticides. Representative compounds are isobutoxy-S-phenyl ethylphosphonodithioate, isobutoxy-S-(4-chlorophenyl) ethylphosphonodithioate, isobutoxy-S-(2-methyl - 5 - chlorophenyl) ethyl phosphonodithioate, and isobutoxy-S-(p-tolyl)ethylphosphonodithioate.

---

This invention relates to certain new isobutoxy ethylphosphonodithioates and their utility as insecticides. The new compounds comprising the present invention have the general formula

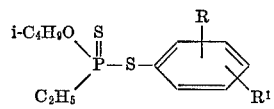

wherein R is hydrogen or methyl and $R^1$ is hydrogen or chlorine.

The phosphonic acid esters of this invention are prepared through the condensation reaction involving an appropriate thiophenol and O-isobutyl ethanephosphonochloridothioate. The reaction is carried out in the presence of a suitable solvent, such as acetone, methylethyl ketone, benzene, toluene, xylene and the like. The solvent can consist of two or more of these solvents. The reaction is promoted by the addition to the reaction system of such organic bases as pyridine, triethylamine, dimethylaniline, or such alkali materials as sodium hydroxide and potassium hydroxide. Normally, there is an initial exothermic reaction which requires cooling and after this period the reaction is taken to completion by heating.

The compounds of the present invention are prepared in accordance with the following illustrative examples:

EXAMPLE 1

Preparation of isobutoxy S-(2-methyl-5-chlorophenyl) ethylphosphonodithioate

Triethylamine (20.2 g., 0.2 M) is added with stirring and cooling (below 30° C.) to a mixture of 2-methyl-5-chlorothiophenol (31.7 g., 0.2 M) and O-isobutyl ethanephosphonochloridothioate (40.1 g., 0.2 M) in 200 ml. benzene. There is an exothermic reaction and a white precipitate is formed. After the addition, the mixture is heated under reflux for about one hour, cooled, poured into water and shaken. The organic layer is separated, combined with a benzene extract of the aqueous layer, washed with dilute potassium hydroxide and water. The organic layer is dried over sodium sulfate, filtered and the organic solvent removed. After distillation, there is obtained 51.2 g. of a liquid $n_D^{30}=1.5702$, boiling point 138° C. at 0.06 mm., 95.1 percent purity by gas chromatography.

Elementary analysis.—Theory (percent): C, 48.36; H, 6.24; S, 19.86. Found (percent): C, 48.51; H, 6.04; S, 19.54. Infrared spectroscopy confirmed the structure.

EXAMPLE 2

Preparation of isobutoxy S-phenyl ethylphosphonodithioate

In a similar manner as Example 1, 13.2 g. (0.12 M) of thiophenol, 20.0 g. (0.1 M) of O-isobutyl ethanephosphonochloridothioate and 12.1 g. (0.12 M) triethylamine are reacted to yield 31.1 g. of crude material. After vacuum distillation B.P. 129° C. at 0.05 mm. there is obtained 19.2 g. of the title compound, $n_D^{30}$ 1.5672.

Elementary analysis.—Theory (percent): C, 52.53; H, 6.98; S, 23.37. Found (percent): C, 52.63; H, 6.70; S, 22.78. Infrared spectroscopy confirmed the structure.

EXAMPLE 3

Preparation of isobutoxy S-(4-chlorophenyl) ethylphosphonodithioate

In a similar manner as Example 1, 17.3 g. (0.12 M) of p-chlorothiophenol, 20.0 g. (0.1 M) of O-isobutyl ethanephosphonochloridothioate and 12.1 g. (0.12 M) of triethylamine are reacted to yield 34.4 g. of crude material. After vacuum distillation, B.P. 154–156° C. at 0.07 mm., there is obtained 26.3 g. of the title compound, $n_D^{30}$ 1.5724.

Elemental analysis.—Theory (percent): C, 46.67; H, 5.87; Cl, 11.48. Found (percent): C, 46.85; H, 5.63; Cl, 11.75. Infrared spectroscopy confirmed the structure.

The compound O-isobutyl S-(p-tolyl) ethyl phosphonodithioate is prepared in a similar manner.

Insecticidal evaluation tests

The following insect species are subject to evaluation tests for insecticidal activity.

(1) Housefly (HF)—*Musca domestica* (Linn.)
(2) German Roach (GR)—*Blattella germanica* (Linn.)
(3) Salt-marsh caterpillar (SMC)—*Estigmene acrea* (Drury)
(4) Milkweed Bug (MWB)—*Oncopeltus fasciatus* (Dallas)
(5) Lygus Bug (LB)—*Lygus hesperus* (Knight)

Aliquots of the toxicants, dissolved in an appropriate solvent such as acetone, are diluted with water containing 0.002% of a wetting agent, Sponto 221® (a polyoxyether of alkylated phenols blended with organic sulfonates). Test concentrations range from 0.1% downward to that at which 50% mortality is obtained. In the tests, utilizing these species, 10 one-month old nymphs of the German cockroach and lygus bug and two-week old nymphs of milkweed bug are placed in separate circular cardboard cages sealed on one end with cellophane and covered by a cloth netting on the other. Test concentrations for the lygus bug range from 0.05% downward to that at which 50% mortality is obtained. Each of the aqueous suspensions of the candidate compounds are sprayed onto the insects through the cloth netting by means of a hand spray gun. Percent mortality in each case recorded after 72 hours, and the $LD_{50}$ values expressed as percent of toxicant in the aqueous spray was recorded.

For testing the salt marsh caterpillar, test solutions are prepared in an identical manner and at concentrations the same as for the German cockroach and the milkweed bug above. Sections of bitter dock (*Rumex obtusifolus*) leaves, 1–1.5 inches in length are immersed in the test solutions for 10 to 15 seconds and placed on a wire screen to dry. The dried leaf is placed on a moistened piece of filter paper in a Petri dish and infested with five third-instar larvae. Mortality of the larvae is recorded after 72 hours and the $LD_{50}$ values are expressed as percent active ingredient in the aqueous suspension to effect approximately 50 percent kill of the test insects.

The following procedure is used to test houseflies. A stock solution containing 100 μg./ml. of the toxicant in an appropriate solvent such as acetone is prepared. Aliquots of this solution are combined with 1 milliliter of an acetone-peanut oil solution in a glass Petri dish and allowed to dry. The aliquots are employed to achieve desired toxicant concentrations ranging from 100 μg. per Petri dish to that at which 50% mortality is attained. The Petri dishes are placed in a circular cardboard cage, closed on the bottom with cellophane and covered on top with cloth netting. Twenty-five female houseflies 3 to 11 days old are introduced into the cage and the percent mortality is recorded after 48 hours. The $LD_{50}$ values are expressed in terms of μg. per 25 female flies.

The results of these tests are given in the following Table I:

TABLE I.—INSECTICIDAL EVALUATION TESTS
[$LD_{50}$ values]

| Example No. | HF (μg./25♀) | Percent | | | |
|---|---|---|---|---|---|
| | | GR | SMC | MWB | LB |
| 1 | 30 | >0.1 | 0.0005 | 0.1 | 0.05 |
| 2 | 8 | 0.05 | 0.001 | 0.08 | 0.03 |
| 3 | 4 | 0.01 | 0.00008 | 0.1 | 0.003 |
| A | 5 | | 0.005 | .03 | |

NOTE.—A=O-ethyl S-(4-chlorophenyl) ethylphosphonodithioate.

Surprisingly, it has been found that the compound of Example 3 has an unexpectedly low mammalian toxicity when compared with a compound of like structure containing an ethoxy moiety. The mammalian toxicity of the compounds O-isobutyl S-(4-chlorophenyl) ethylphosphonodithioate (Compound A of Table I) were compared. The acute oral $LD_{50}$ in male Albino rats obtained for each compound is given in Table II. It can be seen that even though the mammalian toxicity is reduced, the insecticidal activity is maintained and in some cases as shown in Table I, the insecticidal activity is enhanced.

TABLE II.—MAMMALIAN TOXICITY: ACUTE ORAL $LD_{50}$, MALE RATS

| Compound | Reported result Test No. 1 | Reported result Test No. 2 | 95% confidence limits Test No. 2 |
|---|---|---|---|
| Example 3, mg./kg | 79 | 58.4 | 43.0–79.4 |
| A, mg./kg | 6 | 5.84 | 4.30–7.94 |

The same test procedure as mentioned above for salt-marsh caterpillar is used for cotton bollworm (*Heliothis zea* (Boddie)), except that leaves of Romaine lettuce were utilized as the host plant rather than bitter dock. The compound of Example 2 has an $LD_{50}$ of 0.005% and the compound of Example 3 has an $LD_{50}$ of 0.003% against cotton bollworm.

The compounds are also active against black bean aphid (*Aphis fabae* (Scop.)). Nasturtium plants (*Tropaeolum sp.*) approximately 2 to 3 inches tall are used as the host plant. The plants are infested with 50 to 75 aphids of various ages. Twenty-four hours after infestation, they are sprayed to the point of run-off with an aqueous suspension of the candidate toxicant. Test concentrations range from 0.05% to that at which 50% mortality is obtained. The results obtained for the compounds of Examples 1, 2 and 3 against black been aphid in this test are 0.003%, 0.003% and 0.003%, respectively.

Soil insecticide screening procedure.—In this test, the chemical is incorporated into a mixture of sand and vermiculite at a concentration of 5 p.p.m. (parts per million) and placed in a quart jar. Following this step, twenty-five, five-day old housefly (*Musca domestica*) larvae are introduced into the treated soil and allowed to remain in the sealed jar for 48 hours.

At the end of this time, the larvae are removed and placed on moistened filter paper in a Petri dish, at which time the number of motile larvae and the number of pupae are counted. An immobile larva is considered to be dead. The pupae are allowed to remain in the Petri dish until the adult flies have emerged. Mortality is determined by subtracting the number of emerged adult flies from twenty-five, which was the original number of larvae placed into the soil.

If ninety or more percent mortality is obtained at the screening concentration, the compound is tested at lower rates until 50% mortality is obtained. The results obtained in this test are: Example 1—3 p.p.m., Example 2—1 p.p.m., and Example 3—1 p.p.m.

In practice and to realize the desired activity, the insecticides of the present invention are advantageously applied to harmful insects in the form of compositions such as emulsions, suspensions, granules, solutions or dusts. Insecticidal compositions of the present invention comprise essentially at least one active compound represented herein with a suitable carrier or solvent of the type commonly employed for insecticidal agents. Examples of solid carriers are talc, chalk, bentonite, clay, corn grits, and the like. Examples of liquid carriers or solvents are water, xylene, alcohols, lower alcohols such as methanol or ethaol, ketones, such as acetone or methylethyl ketone, liquid petroleum hydrocarbons and the like. The formulations may contain wetting agents, dispersing agents and emulsifiers. They may also contain other agricultural chemicals such as herbicides, fungicides, other insecticides, fertilizers, vermicides, and the like.

The concentration of a compound of the present invention, constituting an effective amount in best mode of administration in the utility disclosed is readily determinable by those skilled in the art. Various changes and modifications are possible without departing from the spirit and scope of the invention described herein and will be apparent to those skilled in the art to which it pertains. It is accordingly intended that the present invention shall only be limited by the scope of the claim.

What is claimed is:

1. The compound isobutoxy S-(4-chlorophenyl) ethylphosphonodithioate.

References Cited

UNITED STATES PATENTS 3,149,143   9/1964   Newallis et al. _____ 260—961
3,305,610   2/1967   Szabo et al. _____ 260—961

CHARLES B. PARKER, Primary Examiner

A. H. SUTTO, Assistant Examiner

U.S. Cl. X.R.

424—222